(12) United States Patent
Peterka

(10) Patent No.: US 6,948,183 B1
(45) Date of Patent: Sep. 20, 2005

(54) DYNAMIC SECURITY FOR DIGITAL TELEVISION RECEIVERS

(75) Inventor: Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 740 days.

(21) Appl. No.: 09/716,682

(22) Filed: Nov. 20, 2000

Related U.S. Application Data

(63) Continuation of application No. PCT/US99/10780, filed on May 14, 1999.
(60) Provisional application No. 60/089,704, filed on Jun. 18, 1998.

(51) Int. Cl.[7] .............................................. H04N 7/16
(52) U.S. Cl. ........................ 725/25; 713/200; 725/140
(58) Field of Search ............................... 713/182, 183, 713/200, 201, 202; 725/25, 28–30, 132, 136, 140, 23, 20

(56) References Cited

U.S. PATENT DOCUMENTS

| | | | | |
|---|---|---|---|---|
| 5,757,417 | A | | 5/1998 | Aras et al. |
| 5,915,085 | A | * | 6/1999 | Koved .......................... 713/200 |
| 5,925,127 | A | * | 7/1999 | Ahmad ......................... 713/200 |
| 5,978,381 | A | * | 11/1999 | Perlman et al. ............... 370/432 |
| 6,044,466 | A | * | 3/2000 | Anand et al. ................. 713/200 |
| 6,047,377 | A | * | 4/2000 | Gong ........................... 713/201 |
| 6,115,079 | A | * | 9/2000 | McRae ......................... 348/731 |
| 6,163,316 | A | * | 12/2000 | Killian ......................... 345/721 |
| 6,256,393 | B1 | * | 7/2001 | Safadi et al. ................. 380/232 |
| 6,484,261 | B1 | * | 11/2002 | Wiegel ......................... 713/201 |
| 6,665,869 | B1 | * | 12/2003 | Ellis et al. .................... 725/39 |
| 6,745,245 | B1 | * | 6/2004 | Carpenter ..................... 709/229 |

FOREIGN PATENT DOCUMENTS

| | | |
|---|---|---|
| EP | 0 732 850 | 9/1996 |
| EP | 0 752 786 | 1/1997 |
| EP | 0 909 094 | 4/1999 |

OTHER PUBLICATIONS

Evain, J.P., "The Multimedia Home Platform," EBU Technical Review, No. 275, Mar. 21, 1998, pp. 4–10.
Thrift, P. et al., "JTV—Java-enabled Television," Proceedings of the SPIE, vol. 3228, Nov. 4, 1997, pp. 117–122.

(Continued)

Primary Examiner—John Miller
Assistant Examiner—Scott Beliveau
(74) Attorney, Agent, or Firm—Robert P. Marley

(57) ABSTRACT

A system that allows service providers, consumer electronic (CE) manufacturers or standards bodies to define flexible security policies (110) for the execution of downloaded applications (120) on digital television (DTV) receivers (160). The current receiver environment in which a software application is to be run is evaluated. For example, environmental factors such as time of day, date, channel currently tuned in, parental lockout status, grouping of major and minor virtual channels, and so forth, may be considered. An access controller (168) determines if the receiver's environmental factors satisfy the conditions for granting a permission to a downloadable application to allow access to the receiver functions (161), receiver resources and user private data. The security policy can be modified by installing or downloading a new security policy (110), or modified by a user with the provision of an appropriate interface. A Java code-implemented embodiment is disclosed.

14 Claims, 3 Drawing Sheets

OTHER PUBLICATIONS

Cutts, D., "DVB Conditional Access," Electronics & Communication Engineering Journal, vol. 9, No. 1, Feb. 1, 1997, pp. 21–27.

EBU Project Group, "Functional Model of a Conditional Access System," EBU Technical Review, No. 266, Dec. 21, 1995, pp. 64–77.

Gong, Li et al., "Going Beyond the Sandbox: An Overview of the New Security Architecture in the Java™ Development Kit 1.2," In Proceedings of the USENIX Symposium on Internet Technologies and Systems, Monterey, California, Dec., 1997.

* cited by examiner

DYNAMIC SECURITY FOR DIGITAL TELEVISION RECEIVERS

This application is a continuation of international application number PCT/US99/10780 filed May 14, 1999 which claims the benefit of U.S. Provisional Patent Application No. 60/089,704 filed on Jun. 18, 1998.

BACKGROUND OF THE INVENTION

The present invention claims the benefit of U.S. provisional Application No. 60/089,704, filed Jun. 18, 1998.

The present invention provides a system for controlling access to receiver functionality and data from downloaded applications in a digital television receiver.

The present invention addresses the issue of security and security policies in the digital television (DTV) application environment. In particular, the invention extends the Java (™) Security Architecture, a product of Sun Microsystems. However, the invention is not limited to a Java programming language implementation.

Java allows programmers to create interactive, multimedia applications for the World Wide Web. For example, Java applications, known as "applets", may comprise an animation, a video clip, an interactive game or other entertaining or educational tool.

The applets are downloaded and run using a browser on a user's computer. The computer may be associated with a digital television receiver that receives the applets, e.g., from a cable or satellite television network, or from a separate telephone link.

An applet is written in Java, then compiled to a bytecode format. An HTML tag "<APPLET>" may be then used to fetch the compiled applet from a current web page. Or, the applet may be fetched from a specified URL using the HTML term "CODEBASE".

Security is an important issue when applets are downloaded and executed on a user's computer. For example, it is desirable to prevent an applet from accessing specific resources of the computer. An applet produced by an attacker could retrieve information already stored on the computer and send it back over a network to the attacker, destroy files already stored on the computer, or consume resources, such as filling up the computer's disk.

It would be desirable to provide a mechanism for allowing only specific users to access receiver functionality and/or the applets, e.g., in a subscriber television network. For example, the applets may be used to provide enhanced features such as on-screen channel guides, stock ticker information, weather information, parental lockout capability, and program rating control enforcement. Access should be granted only to specific users, e.g., upon payment of additional fees.

However, the existing security mechanisms have not been sufficiently flexible to meet these challenges.

Prior art security schemes analyze the source of an application (Uniform Resource Locator or URL of where it came from) and/or a set of signatures (keys) which authenticate the application, and assign it to a security domain based on the local policy settings, again defined by application source, signer and a set of permissions. Once the security domain is resolved, it does not change.

The current Java Security Architecture is centered around security domains based on the application source, its signer(s) and a set of permissions granted to applications. Once the permissions are resolved, the permissions granted to an application are static and do not change over the lifetime of the application (unless the policy configuration changes).

Accordingly, it would be desirable to provide a security policy that grants dynamic permissions, e.g., based on a determination as to whether the current environment satisfies the permission's conditions related to the current state of the receiver (i.e., at the time the permission is checked, not at the time the permission is granted).

The following terminology will be used:

Application Source—location of where the application was downloaded from, mostly in a URL format. For broadcast environments, the Internet-based URL format is extended to cover an MPEG-2 network, transport stream and service, event identification and carousel data filename. The application source is also referred to in the Java language as "CodeSource";

Digital Television (DTV) Receiver—a device capable of receiving digital television signals including video, audio and data components;

Permission—enables access to system resources, receiver functions, user private data, and other sensitive resources which may deserve protection;

Policy—provides an association between Permissions, Application Sources and Signers; and Signer—provides identification of an entity which digitally signed the Application Source.

For further terminology, refer to ATSC Program and System Information Protocol for Terrestrial Broadcast and Cable, (PSIP), A65, December 1997, and Java Security Architecture, Li Gong, Oct. 2, 1998, DRAFT DOCUMENT (Revision 1.0).

In a digital TV broadcast environment, the situation is more complex than what the current Java security architecture addresses. Applications are often associated with virtual video channels that a user is watching. An application associated with that channel or a set of related channels (PSIP major channel number may be the grouping function) should get more access control permissions than an application associated with a channel from another group that is not being watched at the moment. This means that if an application still runs after the user tunes to another channel, e.g., possibly outside the major virtual channel number or a Digital Video Broadcast (DVB) Bouquet, it should lose some or all of its permissions.

A DVB Bouquet is a concept of grouping services (channels) that are broadcast on different transport streams and/or networks together based on a provider or content type or the like. It is represented by a Bouquet Association Table (BAT) in the DVB Service Information (SI) protocol.

Also, it would be desirable for the permissions of an application to be limited by the privileges of the current user, the state of the receiver and/or current time. This requires the security policy to be dynamic.

Note that some applications are automatically terminated after a channel change, but the applications that are not directly associated with the video being viewed may persist across channel changes.

Accordingly, it would be desirable to provide a security policy that addresses the above concerns. Such a security policy should allow an application associated with a group of channels (e.g., the ABC major channel number 10) to persist across channel changes within this group using a set of permissions. As soon as the user tunes away from the ABC domain, the application should be denied some or all of its permissions, or terminated completely.

Moreover, it would be desirable to provide a flexible security policy that allow applications such as a navigation/ channel guide within a broadcast network (such as ABC), but prevents such applications from steering users from another network (such as NBC), preventing access to other networks, or other types of attacks. The security policy should solve the conflicting requirements which, on one hand, force an application to be terminated with a channel change to prevent ABC's logo or other messages showing up on NBC's channel, and, on the other hand, allow applications such as stock tickers or navigation/channel guides to live beyond channel changes.

Furthermore, it would be desirable to provide a system that allows service providers, consumer electronic (CE) manufacturers, end users or standards bodies (such as the Advanced Television System Committee—ATSC) to define flexible security policies for the execution of downloaded applications on DTV receivers.

It would be desirable for the security policy to be suitable for use with parental lockout functions, rating controls, and circular blackout.

It would be desirable for the security policy to be independent of user interaction if desired. The security policy should support multiple concurrent applications and use the current state of a set-top box, which can change at any time (e.g. the current channel number, the current authorization state, the current user, etc.), to determine the result of a security policy permission check.

It would also be desirable to provide the capability for the security policy to accept a user input.

The present invention provides a system having the above and other advantages.

SUMMARY OF THE INVENTION

The present invention provides a system for controlling access to DTV receiver functionality, resources and user data from downloaded applications in a digital television receiver (DTV Receiver).

A security method for controlling access to a function of a digital television receiver, includes the steps of:

(a) providing a software application at the receiver (such as Java code);
the software application being executable in response to an execution command;
(b) providing data defining a condition of the receiver under which access to the receiver function by the software application is permitted (e.g., the condition can be the current channel tuned, the time of day, the current viewer, parental lockout status, and the like);
(c) providing a control signal for requesting access to the receiver function upon execution of the software application;
(d) in response to the control signal, determining whether an associated security policy of the software application contains a permission for the software application to access the receiver function;
(e) if the security policy contains the permission:
   (i) determining whether the condition of the receiver is met by data indicative of a current state of the receiver;
   (ii) allowing the software application to access the receiver function if the condition is met; and
   (iii) preventing the software application from accessing the receiver function if the condition is not met; and
(f) if the security policy does not contain the permission, preventing the software application from accessing the receiver function.

Examples of the application, permission, and condition include:

1. Application: Bouquet Electronic Program Guide (EPG),
   Permission: to execute,
   Condition: the current channel is within the same group of channels (e.g., defined by a major channel number or a by a bouquet provider) that the application was downloaded from;
2. Application: Children's EPG,
   Permission: to watch TV (tune channels),
   Condition 1: current time is between 8 am and 8 pm,
   Condition 2: the channel to watch or tune to must be labeled as children's content;
3. Application: Interactive TV shopping,
   Permission: access to (read) credit card numbers,
   Condition: current user must be "parent";
4. Application: Watch channels with rating over the rating ceiling,
   Permission: override program rating ceiling,
   Condition: user must provide valid PIN code;
5. Application: Advertisement with an order form,
   Permission: execute beyond the scheduled (allocated) time,
   Condition: user must confirm the action.

The condition may indicate a conditional access state of the receiver.

The conditional access state may include a blackout state (e.g., is a blackout of certain programs in effect?), a pay-per-view state (e.g., has a pay-per-view program been ordered?), or an authorization state (e.g., is the receiver authorized to process certain channels, such as premium channels?).

The condition may indicate a user state of the receiver. The user state may include user preferences (e.g., favorite channels or types of programs), a user password, or a user identifier (e.g., a code or name identifying the particular user).

The condition may indicate at least one of a time, date, and day. For example, access to programming may be limited to certain hours of the day, e.g., 8 a.m. to 8 p.m. for children.

The condition may be defined, at least in part, by the software application.

The condition may indicate that a channel or group of channels is tuned by the receiver.

The software application may be downloadable to the receiver via a broadband television network, such as a cable or satellite television network.

The method may include the further step of providing a user interface to allow a user to define the permission of the security policy.

The software application may include Java code, although the invention is not limited to this type of code.

The execution command may be initiated by a user, e.g., through a proper user interface.

The permission may be associated with a user of the receiver.

The condition may be embedded in code that defines the permission.

The software application may be multicast to a receiver population including the receiver, e.g., via a cable or satellite path.

A user interface may be provided to allow a user to define the data defining the condition.

A corresponding receiver apparatus is also presented.

DETAILED DESCRIPTION OF THE INVENTION

The present invention provides a system for controlling access to DTV receiver functionality, resources and user data from downloaded applications in a digital television receiver.

Figure 1:
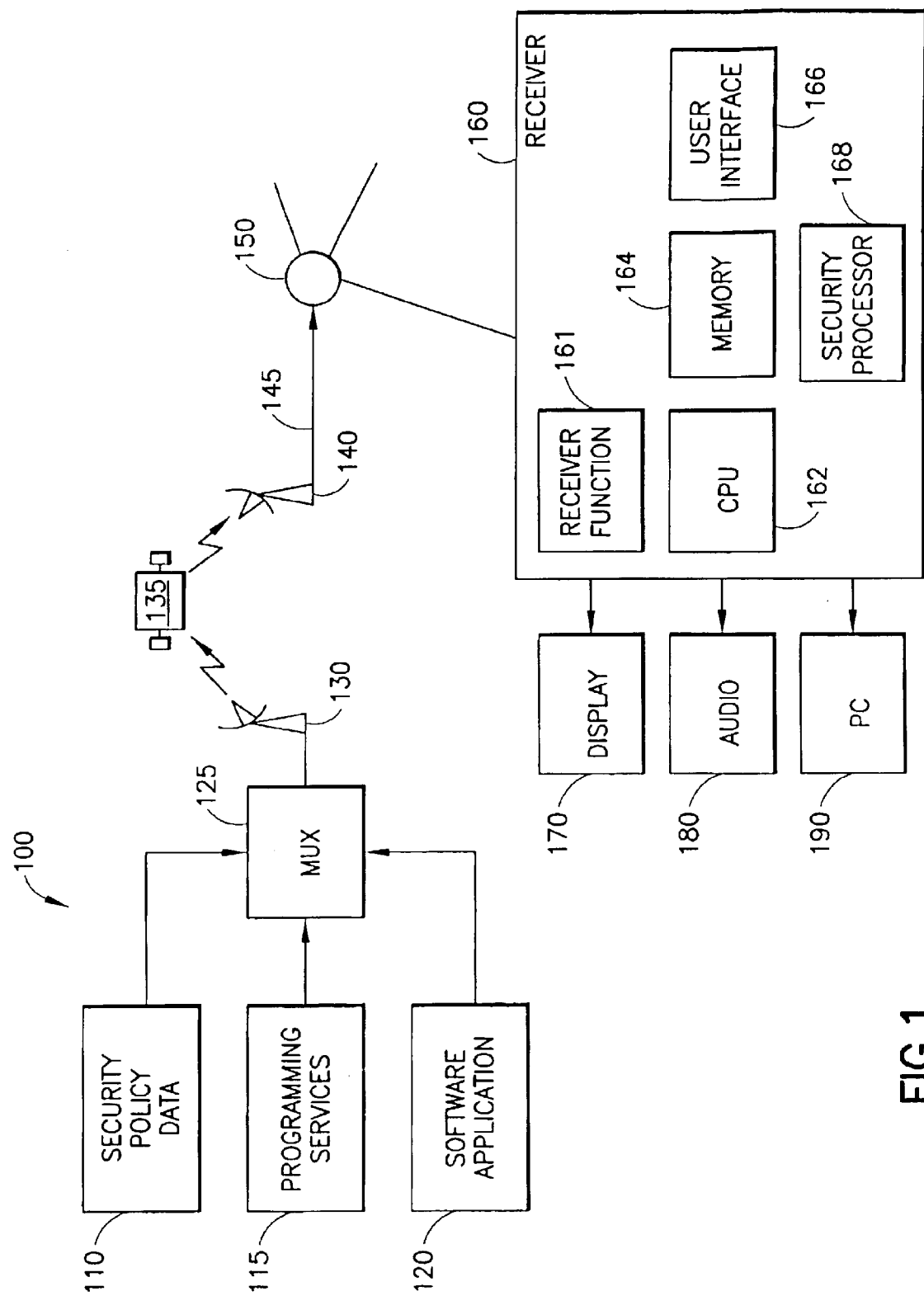
FIG. 1 illustrates a digital television broadcast network in accordance with the present invention.

FIG. 1 illustrates a digital television broadcast network in accordance with the present invention. A headend 100 of the network includes a security policy data function 110, a programming services function 115, and a software application function 120. Data from each of the functions 110, 115 and 120 may be multiplexed at a MUX 125 and broadcast to a subscriber decoder (e.g., set-top box) population. A satellite transmitter 130, satellite 135, and receiver (e.g., also known as a set-top box, decoder, or subscriber terminal) 140 are provided for this purpose.

However, a satellite network is just an example of a broadcast network. Any known transmission scheme may be used, including cable, terrestrial broadcast and/or the Internet. For example, multicast to a receiver population via the Internet may be used.

The data from the functions 110, 115 and 120 need not be multiplexed, but may be provided via separate communication paths. The security policy data and the software application may be loaded manually at the receiver 160, e.g., using a smart card, or transmitted to the receiver 160 via a telephone link, for example. The security policy data and/or software application may also be installed in the receiver at the time of manufacture.

In expected implementations, the security policy data need not change frequently, in which case the capability to download the security policy data to the receiver is not as important. The software application data is expected to change more frequently, and therefore the capability for remote downloading of new software to the receiver is believed to be important.

A cable network 145, e.g., with a hub 150, is used to provide the transmitted data to the receiver 160.

An upstream communication path may be provided to allow the receiver 160 to communicate with the headend 100. This may be achieved by an upstream path in a cable network, or via a telephone link, for example.

The software applications, such as applets, or a new type of applet known as an Xlet(™), (Sun Microsystems), from the software application function 120 are broadcast to each of the receivers in the subscriber network. The applications may be downloaded and stored at the receivers for subsequent execution using known techniques. Note that while applet-like application code is referred to, the invention may be adapted for use with other types of code.

The security policy data may be provided to all receivers, or targeted to specific receivers, e.g., according to known addressable receiver techniques. The security policy data allows the downloadable applications of the software application function 120 to access certain receiver functionality, resources and/or user data. This access is given in the form of permissions, discussed below.

The programming services function 115 provides conventional television programs, for example, although other services such as shop-at-home programs, educational access, interactive game shows, polling and the like may also be provided.

The receiver is shown having a receiver function 161, a central processing unit (CPU) 162, a memory 164, a user interface 166, and a security processor 168. The security processor 168 is shown as a distinct element, although it should be appreciated that the proposed security architecture may be implemented without a special security hardware, e.g., as with current personal computers that implement the existing Java security architecture without a dedicated security processor. The security processor 168 can be thought of as a function block. The receiver 160 may be implemented using any known hardware, firmware, and/or software. Additionally, the different functions discussed here and in FIG. 2 may share common circuitry.

The receiver 160 processes the received data to provide signals for the display 170 (e.g., television screen), audio function 180 (e.g., speakers), and/or a personal computer (PC) 190, for example. Other output devices may also be provided.

The security processor 168, which can be implemented in hardware or software, receives and processes the security policy data from the security policy data function 110.

The user interface 166 allows a user to enter commands, e.g., to view the programming services from the function 115 and applications from the function 120, using a conventional interface device, such as a hand held remote control. An appropriate graphical user interface (GUI) may be provided for this purpose. The user may also define or modify parameters (e.g., the security policy data) of the security processor 168, again preferably through an appropriate user-friendly interface.

The receiver function 161 refers to any of a number of functions that the receiver 160 can implement, such as a displaying particular television programs or channels, changing channels (i.e., tuning), accessing user private data (e.g. credit card numbers, personal preferences, etc.), ordering pay-per view programs, enabling a parental lockout capability, dialing a modem for on-line shopping, and the like. A common characteristic of the receiver functions is that it is desirable to protect these functions from unauthorized access.

The receiver function 161 may be classified into various categories, e.g.: (1) access or use of a receiver device (e.g., modem, tuner, etc.); (2) receiver functionality, such as performing IPPV purchase, overriding parental lockout, starting and stopping an application, providing access to another application, etc.; and (3) read and/or write access to user data, such as user preferences (preferred language, list of favorite channels), user statistics (channels watched most often), user private data (use real name, credit card number, address, phone number, age, etc.).

Figure 2:
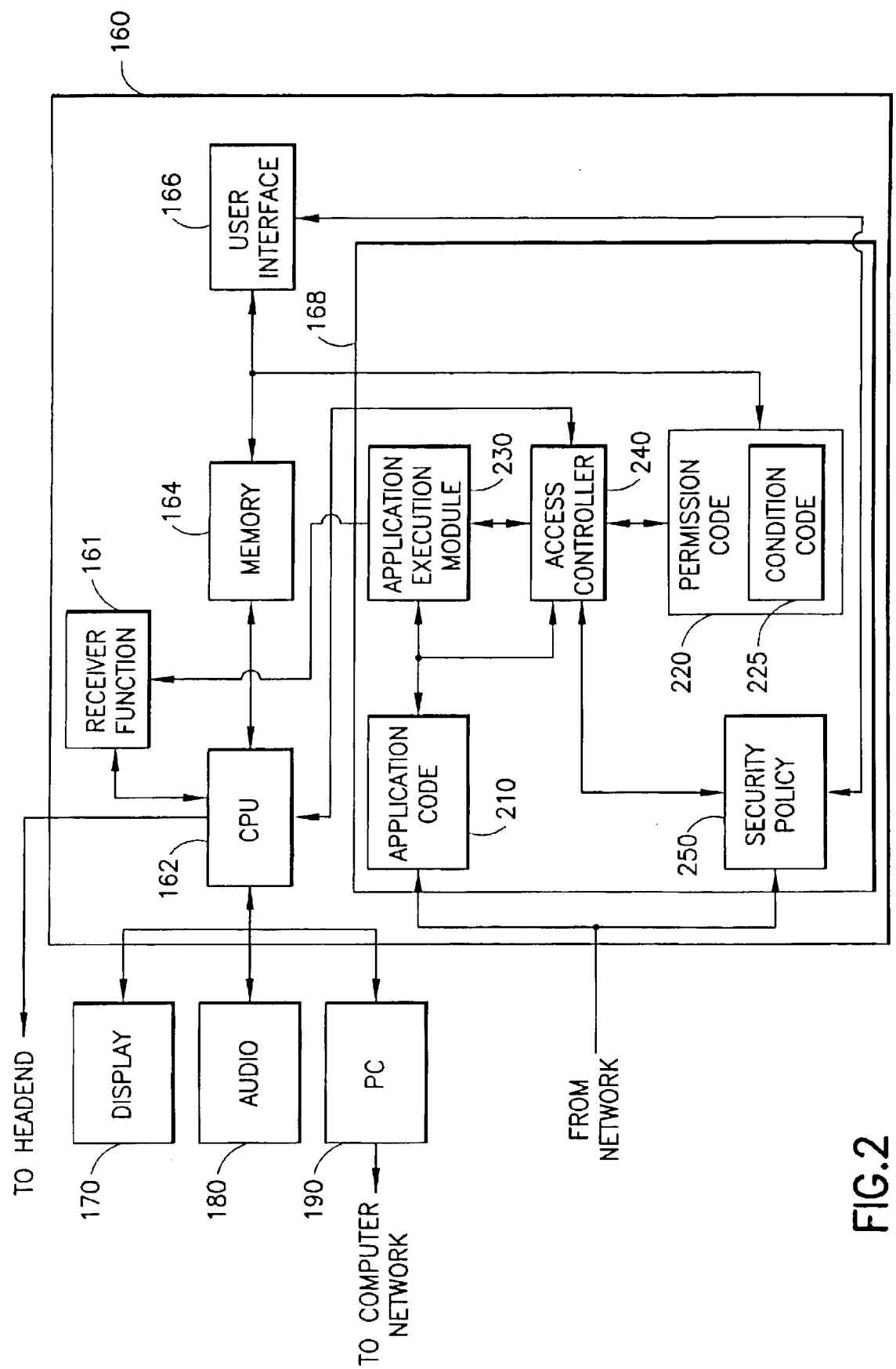
FIG. 2 illustrates a receiver in accordance with the present invention.

FIG. 2 illustrates a receiver in accordance with the present invention. Like-numbered elements in the figures correspond to one another. The security processor 168 includes a variety of functional elements, which are shown as discrete modules. However, it should be appreciated that the module functions can be implemented using any known hardware, firmware, and or software, and may share common circuitry. The arrangement shown is therefore diagrammatic and not necessary at the circuit level.

An application code module 210 receives the software application code, e.g., from the software application module 120 of FIG. 1. Accordingly, the code can be updated as desired by the network operator or other entity. New application code can be downloaded to replace, modify or supplement existing code at the code module 210.

An application execution module 230 (e.g. Java Virtual Machine—JVM) can execute the application code under conditions discussed below. In response to the application code, the application execution module 230 attempts to invoke the receiver function 161, e.g., to implement any of a number of available receiver functions, including access to user private data. Note that only one receiver function module 161 is shown to represent any number of available receiver functions. Moreover, the application execution module 230 may attempt to invoke more than one function at a given time.

The downloadable application can execute under several conditions, for example: (1) the protocol which delivers it signals an "auto-start" command (e.g., as specified by ATSC T3/S13 standard), (2) a user action starts the application (e.g. from an EPG which lists available applications, or by clicking on an icon on the TV screen which invokes the applications), or (3) by activating an application based on time (e.g., a user may set a timer to invoke a particular application at certain time). The auto-start command, the user action, or any other activity that causes execution of the application is considered to be an "execution command".

Conventional techniques for compiling, interpreting and executing code at the application execution module 230 are assumed known and are therefore not discussed in detail here.

A "permission" is provided for each receiver function 161 at a permission code module 220, which includes a condition code module 225. The receiver function 161 signals an access controller 240 via the CPU 162 that a particular application is trying to invoke a particular receiver function. Each permission and/or application may have an associated name, index or other identifier, which is provided and can be updated by, e.g., the headend 100.

The access controller may be implemented by using the "AccessController" module that is currently built into Java.

The access controller is thus indirectly initiated by the executing application. When the application tries to invoke a receiver function which is protected by a security policy, the receiver implementation of that function initiates the check for the presence of the permission as well as the condition by calling the access controller 240.

In response to the signal from the receiver function 161, the access controller 240 obtains the corresponding permission from the permission code module 220, and the corresponding condition from the condition code module 225.

The access controller 240 may be a module that is built in to a Java Virtual Machine.

The receiver function 161 may communicate with the access controller 240 and permission code module 220 via the application execution module 230.

The access controller 240 determines who the caller of the receiver function is (e.g., by identifying the application code in 210), and checks to determine whether the caller has the appropriate permission to invoke the receiver function 161 by searching the security policy module 250. If the caller does not have the required permission, the call fails and the original request is denied.

Thus, both the presence of the permission as well as the conditions are examined by the access controller 240. The condition is physically part of the permission but conceptually is shown as a separate module 225. The condition code generally is not delivered from the network. The permission code, which includes the condition, is physically on the receiver 160. The name of the permission and an association to a particular application are delivered to the receiver from the network, or provided locally, and stored in the security policy module 250. The actual code (e.g., Java code) which represents the permission and the condition is present in the implementation of the receiver.

The security policy module 250 lists (e.g., contains) the names of the associated permissions (e.g., as a character string). The implementation of the receiver function 161 constructs the physical permission object (e.g., real Java code in the permission code module 220) which is required to access this function, and hands the permission over to the AccessController 240. The AccessController 240, in turn, determines who the caller (e.g., application code module 210) is, and the name of the permission, and checks it against the security policy 250, which lists the pairs of application-permission names.

In accordance with the present invention, even if the caller has the required permission, a further check is made to determine whether a "condition" of the receiver 160 is satisfied. This is determined at the access controller 240 by analyzing the current environment of the receiver 160. The implementation which checks the condition is contained in the permission code itself (e.g. checkCondition( ) method) to make the AccessController implementation independent of the permissions and conditions. This will allow the Access-Controller to support permissions and conditions defined in the future without requiring a change in the AccessController implementation.

Data indicating the current environment of the receiver, such as time of day or date, parental lockout status, pay-per-view status, current viewer, current channel number selected, current authorization state of the receiver, blackout status, rating ceiling active, and so forth can be provided to the access controller by the CPU 162. The current environment can be anything that is relevant to the receiver 160, and potentially changes over time.

The conditions may be grouped into four general categories: (1) all conditions related to the CA (conditional access) states, such as authorization state, blackout state, IPPV state, etc.; (2) conditions related to the user, such as user preferences (e.g., rating ceiling, capability to purchase IPPV or any e-commerce related capabilities), user PIN code/password, etc.; (3) time-related conditions (e.g., children can watch TV only between 8 a.m. and 8 p.m., modem can be used only after midnight, etc.); and (4) application-origin related conditions (e.g., an application will have different capabilities on the channel it came from than on other channels).

Regarding item (4), one specific permission/condition relationship that is believed to be particularly useful is to allow an application to run on a channel it is associated with (or a group of channels defined by major channel number or a bouquet), but not on other channels. The invention allows an ABC application (e.g., an animated ABC logo) to run on all ABC channels, for instance, but protects NBC (or any other broadcaster) from such an application appearing on their channels.

The CPU 162 may obtain the current environment data from the memory 162 or other appropriate location. The provision and communication of such current environment data to the access controller 240 may be realized using conventional communication techniques and therefore is not discussed in greater detail.

If the access controller 240 determines that the condition defined by the condition code 225 is satisfied by the current environment data, the requested receiver function is allowed. The access controller 240 may send a corresponding signal to the receiver function 161, e.g., via the CPU 162, to enable the receiver function to continue. If the access controller 240 determines that the condition is not satisfied, the call fails and the original request to invoke the receiver function is denied. The access controller 240 may send a corresponding signal to the receiver function 161 to prevent it from carrying out the requested action. The condition may actually include a number of separate conditions.

The access controller 240 may be implemented using a look-up table as follows:

| application | permission | condition |
| --- | --- | --- |
| A | use modem | only if user allows |
| A | tune channels | only within a major channel # |
| B | access to credit card # | only if user = parent |
| B | order IPPV movies | only if user = parent |
| C | watch TV between 8 a.m.–8 p.m. | user = child and time is between 8 a.m. and 8 p.m. |

For example, application "A" may be an interactive advertisement which can tune to an infomercial channel and process an order form for a catalog, application "B" may be an e-commerce application, and application "C" may be a navigation application for children, such as an Electronic Program Guide (EPG)-like application which shows only children's programs.

The current environment must match the condition for the corresponding receiver function to be allowed. Note that the application may still invoke other functions than those which are not allowed with no problems and continue executing.

It is possible to pass a signal to the user, e.g., via the display 170, to inform the user of the status of an application, e.g., whether the application is permitted or denied. Depending on the particular implementation of the receiver and/or the application, it may or may not be desirable to provide such messages to the user.

Moreover, the application code may or may not be executed at the application execution module 230 if the requested receiver function is not permitted by the access controller 240. This depends on what the invoked function is. For example, if the requested receiver function is to access a modem associated with the receiver 160, and the access is denied because the application did not have the "modem" permission, the application can still execute, but it can't use the modem. If the requested function is the basic request to execute, and if it is denied, then the application stops executing.

Note that the "caller" of the receiver function 161 is an application that was, e.g., downloaded to the receiver. The purpose of a security policy for such receivers (e.g., set-top boxes), is provide some control over applications that can be downloaded to the receiver, sometimes without the knowledge of the user (e.g., TV viewer). The downloaded application calls a certain function of the receiver (such as dialing a modem, tuning to a new channel, changing the value of user preferences, accessing credit card number information, etc.).

The implementation of this function is typically specific to each receiver, resident on the receiver, and not downloaded with the application. Some type of mechanism must be used to be able to determine whether the calling application should be allowed to perform the requested function.

This is achieved by checking the permissions that are granted to the calling application (the caller). Permissions are usually stored in a security policy module 250. In the Internet model, this is a file stored on a PC, and a user can modify the policy file. In the TV domain, the policy file can be set up by the user (e.g., the owner of the receiver) assuming that the receiver has an appropriate user interface, or by the network operator, in the case of a cable network or a single provider satellite network, or by individual content providers/broadcasters for their channels, or by any combination of the above.

The delivery of the policy to the receiver may use any conventional means.

The permissions are generally granted to a downloadable application which is either signed or comes from a well-defined source (such as a URL, or a specific TV channel, etc.). It is possible for the user to define the permissions. The permissions are intended to provide security for the receiver to prevent against malicious applications (such as an application which gets downloaded to the receiver and dials out toll numbers all night long, or an application that prevents the viewer from changing the channel outside a particular group of channels, or degrades the television image or audio for certain channels, and so forth).

So, the application requesting to invoke a receiver function is first checked by the access controller 240 to determine whether it has such a permission (e.g., co use a modem or dial out toll numbers, etc. in the example above).

The present invention extends this security mechanism to not only check the presence of such a permission, but also check for current conditions of the receiver, such as the current channel, blackout status, authorized state, current viewer, and so forth. For example, the application may have a permission to initiate electronic commerce transactions (e-commerce), encompassing home shopping, only if the current user has such permission. For example, if the current user is a parent, then the e-commerce application can proceed. If the current user is a child, then the e-commerce application cannot proceed.

Permissions can be also associated with a user, such as in the case above, where some users can do e-commerce, IPPV, etc. and some can't. Applications can therefore be run on behalf of certain users. The current viewer can be determined by having the viewer enter a personal identification number (PIN) or other password, e.g., when the user first turns on the TV. The receiver can then make a decision to allow a certain application to perform a certain operation not only based on a permission granted to the application itself, but also based on permissions granted to the current user.

The condition of a permission associated with a user may be that the current user must have the permission (as well as the application having the permission). For example, consider an application that has a permission to watch PG-rated movies. Further assume there are two users of the TV receiver: one has a permission to watch only G-rated movies; the other one has a permission to watch G and PG movies. When the application executes, its permission is checked and it passes (since the application has a PG permission). However, the code that checks the condition must determine who the current user is, and determine his/her permission. The user must have the appropriate permission to watch the program.

The association of a permission with a user can be achieved in various ways, e.g.: (1) the Access Controller determines who the current user is and checks his permissions as well as the application permissions (they both must have permission to proceed) or (2) the user is specified as a condition of the permission—in this case the access controller, as part of checking the condition, determines who the current user is, and whether the user has a given permission (not necessarily the same as the application has—e.g., the application may have a permission to use a modem, while the user may need a permission to perform e-commerce transactions, therefore using the modem).

As mentioned, permissions can be associated with downloadable applications as well as with specific users. There may only be one policy on the receiver which is aware of multiple users of the receiver.

Additionally, the condition may be associated with the permission, and checked by the Access Controller to provide security for the condition. The fact that the condition is embedded in the permission code and checked by the Access Controller at the same time, makes it more secure (not just the fact that these two are associated by some means).

Furthermore, with an appropriate interface, a user may define the condition of the receiver under which access to the receiver function by the software application is permitted. For example, a user could define a time frame for children to watch the TV (e.g., between 8 a.m. and 8 p.m.). The condition could require that the current time must be between the beginning and the end of the time window allowed for children. This window may be defined by the user via a user preferences function in a manner known to those skilled in the art.

The user may not know he is setting permissions or conditions for the security policy—he is just setting his user preferences, which are used to evaluate the conditions.

Regarding the type of applications run on the receiver, the receiver may run applets if it is Internet-capable and can download applets from the Internet, or have them delivered in the broadcast stream, but the current direction some standard bodies (such as ATSC, DVB) and Sun are going is towards the use of the previously-mentioned Xlet, which is similar to an applet, but is meant for the broadcast/TV domain.

The present invention is suitable for, but not limited to, applications defined by applets and Xlets.

Moreover, while the network associated with the receiver 160 can be a satellite, cable or terrestrial network, the invention is also suitable for use with applications delivered over the traditional Internet or any other means. The security policy itself resides on the receiver 160, but can be delivered or updated or extended from different sources, such as from the PC 190, or it can be pre-installed in the receiver at the time of manufacture. Moreover, the user may set or modify the policy, e.g., via the user interface 166.

Figure 3:
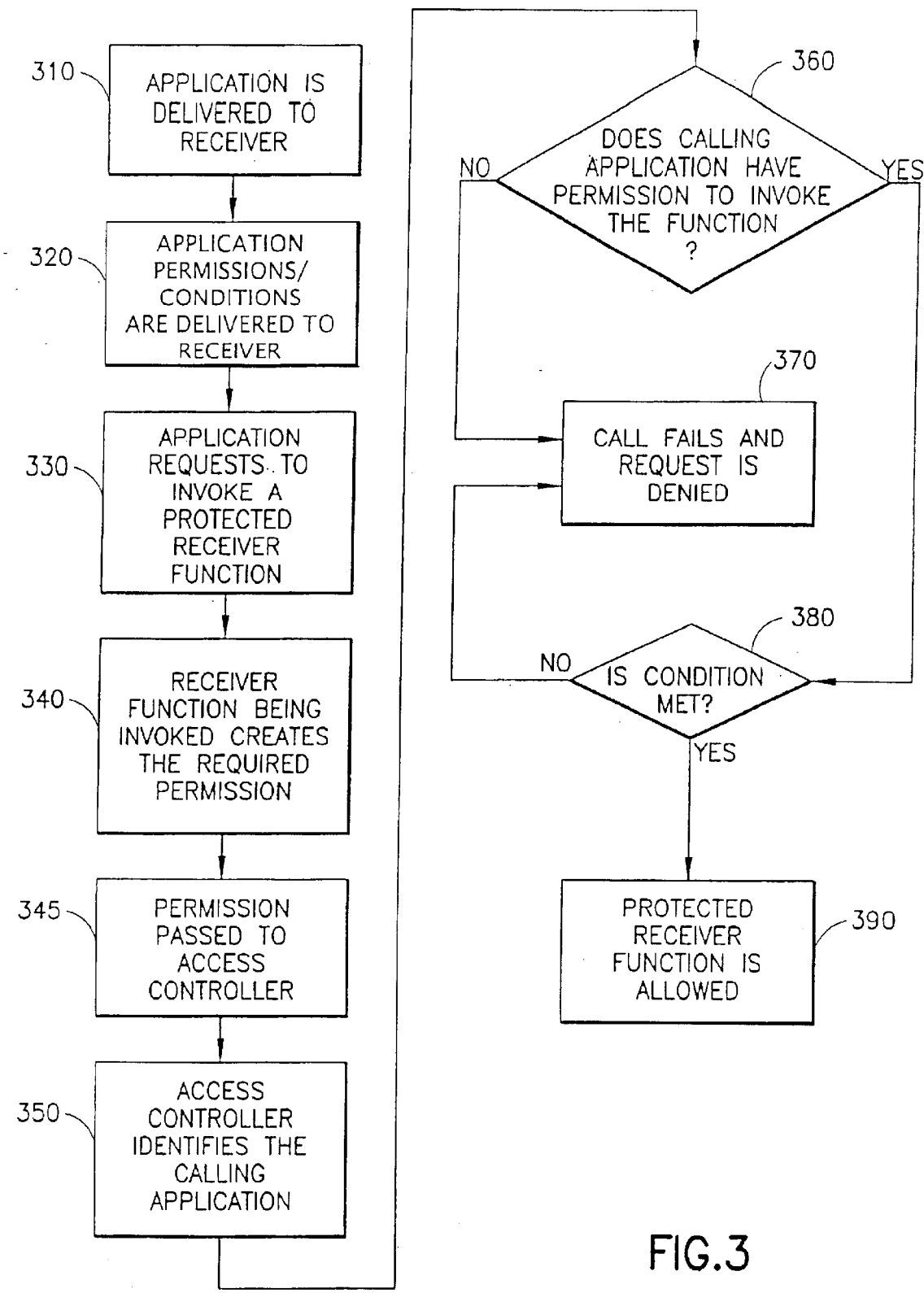
FIG. 3 illustrates an access control method in accordance with the present invention.

FIG. 3 illustrates an access control method in accordance with the present invention. At block 310, the software application is delivered to the receiver (typically to a receiver population). At block 320, the application permissions are delivered to the receiver. Note that the order of delivery of the application and application permission is not important, although the permissions must be delivered before the application can execute.

At block 330, the application requests to invoke a receiver function that is protected by a security policy. At block 340, the implementation of the receiver function being invoked creates the required permission, which may be hard coded in the implementation code. At block 345, the permission is passed to the access controller. At block 350, the access controller identifies the original caller (e.g., the application). At block 360, the access controller determines whether the caller has the appropriate permission (as passed at block 345). If the caller does not have the permission (block 370), the call fails and the original request to invoke the receiver function is denied.

If the caller has the permission (block 380), the condition is checked by the access controller. If the condition is not satisfied (block 370), the call fails and the original request is denied. If the condition is satisfied (block 390), the requested receiver function is allowed.

Advantageously, the present invention uses a dynamic approach to providing access control for the software applications. In contrast, traditional access control mechanisms are static. In traditional solutions, the user is required to possesses a key (or a tier) to access a certain channel (e.g., program). This mechanism may be extended via a personal identification number (PIN), e.g., to provide the capability to purchase interactive pay-per-view (IPPV) programs, or effecting a parental lockout function. The PIN therefore adds conditions to the original authorization. Moreover, these extensions require user interaction and apply to the entire environment, which means, e.g., that the user can override the parental lockout on any channel if the parental lockout PIN is provided.

Regarding rating control schemes, unlike the present invention, in which the end user and the content provider are both protected, the purpose of the prior art rating control schemes is to protect only the end user. With such rating control, the end user is in charge of defining the security policy that applies (e.g., setting the conditions, rating ceiling and the password). In contrast, with the present invention, the network's service provider is in charge of defining the policy to protect the different content providers that are on the network. The prior art rating control scheme is not dynamic in the sense that the channel is either always locked (the user does not have the password) or always accessible (the user has the password).

In the present invention, the same application runs on certain channels but does not run on others, e.g., when the user tunes to another channel, sometimes the application stays on, and sometimes it is terminated, depending on the definition of the policy. In the prior art rating mechanism, changing channels really means switching applications (considering a video channel an application). The present invention can accommodate multiple simultaneous applications (e.g., a data application running on top of a video channel), where changing channels sometimes leaves the same data application on, and sometimes does not, based on the security policy and the current state of the receiver.

Another example of an existing static mechanism is circular blackout, which is based on the location of the set-top box defined by the postal code (e.g., ZIP code). Using a circular blackout scheme, a user (e.g., television viewer) is blacked out on any channel that includes the local ZIP code in the blackout list. The present invention overcomes the inherent limitations of prior circular blackout schemes by making the security policy mechanism independent of user interaction. In particular, the present invention supports multiple concurrent applications and uses the current state (e.g., the current channel number) of the set-top box, which can change at any time, to determine the result of the security policy permission check (e.g., whether the user should be permitted to access an application).

The examples described above are specifically targeted to an ATSC, DVB and DAVIC DTV environment using Java as the Virtual Machine for implementation. However, the invention is also applicable to non-Java-based implementations, as well as any other non-DTV devices which must implement a flexible security policy for downloadable software applications. Moreover, the algorithms described herein are applicable to any dynamic evaluation of software access to secure resources based on static permission assignments to code sources and the current (at the time of making the access request) state of the device.

A scheme for resolving access rights in accordance with the present invention evaluates the current conditions (e.g., environment) of the DTV receiver, such as the channel tuned to, before granting the permission. The security domain can still be defined at the class loading time, but the permissions (or a subset of the permissions) granted to that domain are conditionally based on the immediate state of the device.

"Class loading" is a Java term for the process of providing Java class files from a network (e.g., Internet), or wherever the class files are stored (e.g., headend) to the memory of a computer, or in particular, to a receiver capable of running Java applications, so that the class files can be executed.

An example could be a permission that allows an application to live across a channel change, with the condition being that channel changes are only within the major virtual channel of the source of the application. The concept of major and minor virtual channels is described in detail in *ATSC Program and System Information Protocol*, (PSIP), A65. A major virtual channel is typically associated with a particular national network (e.g., ABC), while the minor virtual channel may be local affiliates, for instance. A channel numbering scheme may be employed that indicates the affiliation to help build consumer good will towards a particular "family" of major and minor virtual channels.

As another example, assume that the ABC television network has a major virtual channel number 10, and three minor virtual channel numbers 0.1, 0.2 and 0.3. For example, channels 10.1 and 10.2 can be TV audio/video channels, and channel 10.3 can carry a news ticker. The news ticker may be provided according to Java or another language. If desired, the viewer can invoke (e.g., select) the news ticker, which continuously scrolls along a portion of the screen even when the viewer switches between channels 10.1 and 10.2.

The security policy scheme of the present invention can be used to automatically terminate the execution of the news ticker application whenever the viewer tunes outside of the major channel number 10, and to restore the application when the viewer tunes back to the major channel number 10.

In one embodiment, the present invention extends a conventional permission evaluation algorithm such as the JDK (Java Development Kit available from Sun Microsystems JavaSoft Division) 1.2 basic algorithm. This algorithm is used for checking permissions to determine whether access by an application is granted or denied, but does not consider receiver conditions as explained herein.

Two exemplary embodiments of the extended algorithm in accordance with the present invention are shown below. The embodiments are illustrated using a Java-like pseudo-code.

Scheme 1 - Basic Permission Checking Algorithm Using Conditional Permissions:

```
obtain current environment
i = m;
// iterate through the call chain
```

Scheme 1 - Basic Permission Checking Algorithm Using Conditional Permissions:

```
while (i > 0) {
    // check the caller's permissions
    if (caller i's domain does not have
        the permission)
        throw AccessControlException
    // permission is satisfied, now check
    // conditions
    else if (current environment does not satisfy
        the permission's conditions)
        throw AccessControlException
    // if caller is privileged, stop checking
    else if (caller i is marked as privileged)
        return;
    i = i - 1;
};
```

The above pseudo-code "else if (current environment does not satisfy the permission's conditions) throw AccessControlException" is added in accordance with the present invention. "Throw" is a Java control statement that deals with handling of exceptions, such as attempting to divide by zero, or attempting to access unauthorized information.

As discussed in detail previously, the "current environment" may indicate factors such as the channel currently selected, the identity of the current TV user, the current authorization state of the receiver, the current time, etc.

The complete algorithm utilized by the JDK 1.2 AccessController checkpermission method also uses the concept of "context" and "inherited context". These concepts are defined in *Java Security Architecture*, Li Gong, Oct. 2, 1998, DRAFT DOCUMENT (Revision 1.0).

Generally, a Java program includes one or more packages, each of which contains class definitions. A class definition is a template for producing object instances. In a common class, each object instance has the same state variables and methods. Each class is based on another class (superclass). A subclass inherits the methods of its superclass based on the property of inheritance. The set of all classes forms a tree, where an "Object" is at the top.

Moreover, Java programs can have multiple threads of control. To avoid race conditions, the control statement "synchronized" may be used to delimit a block of code or a procedure that must not have more than one active thread at a given time.

Suppose, for example, that a current thread traversed m callers (e.g., different classes of an application), in the order of caller 1 to caller 2 to caller m. Then, caller m invokes the checkPermission method. One possible checkpermission algorithm useful to determine whether access is granted or denied is as follows:

Scheme 2 - Extended Permission Checking Algorithm Using Context and Inherited Context:

```
obtain current environment
i = m;
while (i > 0) {
    if (caller i's domain does not have the
        permission)
        throw AccessControlException
    else if (current environment does not satisfy
        the permission's conditions)
        throw AccessControlException
```

-continued

Scheme 2 - Extended Permission Checking Algorithm Using Context and Inherited Context:

```
        else if (caller i is marked as privileged) {
            if (a context was specified in the call to
                doPrivileged)
                // check the context for permissions
                // and conditions (see Scheme 1)
                context.checkPermission(permission);
            return;
        }
        i = i - 1;
    };
    // Next, check the context inherited when the thread
    // was created. Whenever a new thread is created,
    // the AccessControlContext at that time is stored
    // and associated with the new thread, as
    // the "inherited" context.
    // Both permission and condition is checked as
    // shown in Scheme 1
    inheritedContext.checkPermission(permission);
```

It should now be appreciated that the present invention allows service providers, consumer electronic (CE) manufacturers, end users or standards bodies (such as the Advanced Television System Committee—ATSC) to define flexible security policies for the execution of downloaded applications on DTV receivers. The flexibility or even existence of some types of applications would be impossible without such a mechanism.

The present invention examines the current environment in which a software application is to be run (such as in a receiver), and determines if the receiver's environmental factors satisfy the conditions for granting a permission to an application to allow access to the receiver function, receiver resource and/or user private data.

The security policy can be modified by installing or downloading a new policy file or updates to the policy file, or even by a user with the provision of an appropriate user interface.

Although the invention has been described in connection with various specific embodiments, those skilled in the art will appreciate that numerous adaptations and modifications may be made thereto without departing from the spirit and scope of the invention as set forth in the claims.

What is claimed is:

1. A security method for controlling access to a function of a digital television receiver, comprising the steps of:
   (a) providing a software application at the receiver; said software application being executable in response to an execution command;
   (b) receiving data at the receiver from a headend, said data defining a condition of the receiver under which access to the receiver function by the software application is permitted;
   (c) receiving information at the receiver from the headend, said information defining a security policy for said software application which contains a set of permissions for said software application;
   (d) providing a control signal for requesting access to the receiver function upon execution of said software application;
   (e) in response to said control signal, determining whether the security policy for the software application contains a permission for the software application to access the receiver function;
   (f) if said security policy contains said permission:
      (i) determining whether said condition of the receiver is met by data indicative of a current state of the receiver;
      (ii) allowing the software application to access the receiver function if the condition is met; and
      (iii) preventing the software application from accessing the receiver function if the condition is not met; and
   (g) if said security policy does not contain said permission, preventing the software application from accessing the receiver function;
   wherein said condition of the receiver indicates a user state of the receiver; and said user state comprises comprising at least one of: user preferences, a user password, and a user identifier.

2. The method of claim 1, wherein said condition further indicates a conditional access state of the receiver.

3. The method of claim 2, wherein said conditional access state comprises at least one of: a blackout state; a pay-per-view state; and an authorization state.

4. The method of claim 1, wherein: said condition of the receiver further indicates at least one of a time, date, and day.

5. The method of claim 1, wherein: the permission is associated with a user of the receiver.

6. A security method for controlling access to a function of a digital television receiver, comprising the steps of:
   (a) providing a software application at the receiver; said software application being executable in response to an execution command;
   (b) receiving data at the receiver from a headend, said data defining a condition of the receiver under which access to the receiver function by the software application is permitted;
   (c) receiving information at the receiver from the headend, said information defining a security policy for said software application which contains a set of permissions for said software application;
   (d) providing a control signal for requesting access to the receiver function upon execution of said software application;
   (e) in response to said control signal, determining whether the security policy for the software application contains a permission for the software application to access the receiver function;
   (f) if said security policy contains said permission;
      (i) determining whether said condition of the receiver is met by data indicative of a current state of the receiver;
      (ii) allowing the software application to access the receiver function if the condition is met; and
      (iii) preventing the software application from accessing the receiver function if the condition is not met; and
   (g) if said security policy does not contain said permission, preventing the software application from accessing the receiver function;
   wherein said condition of the receiver indicates that one of a channel and a group of channels is tuned by the receiver.

7. The method of claim 6, wherein: said condition of the receiver is defined, at least in part, by said software application.

8. The method of claim 6, wherein: the software application is downloadable to the receiver via a broadband television network.

9. The method of claim 6, wherein: the software application is multicast to a receiver population including said receiver.

10. The method of claim 6, wherein: the software application comprises a Java code.

11. The method of claim 6, wherein: the execution command is initiated by a user.

12. The method of claim 6, wherein: the condition of the receiver is embedded in code that defines the permission.

13. A security apparatus for controlling access to a function of a digital television receiver, comprising:
- (a) means for providing a software application at the receiver;
- said software application being executable in response to an execution command;
- (b) means for receiving data at the receiver from a headend, said data defining a condition of the receiver under which access to the receiver function by the software application is permitted;
- (c) means for receiving information at the receiver from the headend, said information defining a security policy for said software application which contains a set of permissions for said software application;
- (d) means for providing a control signal for requesting access to the receiver function upon execution of said software application;
- (e) means for determining, in response to said control signal, whether the security policy for the software application contains a permission for the software application to access the receiver function;
  - (f)(i) means for determining whether said condition of the receiver is met by data indicative of a current state of the receiver when said security policy contains said permission;
  - (f)(ii) means for allowing the software application to access the receiver function if the condition is met, and when said security policy contains said permission;
  - (f)(iii) means for preventing the software application from accessing the receiver function if the condition is not met, and when said security policy contains said permission; and
- (g) means for preventing the software application from accessing the receiver function if said security policy does not contain said permission, wherein said condition of the receiver indicates that one of a channel and a group of channels is tuned by the receiver.

14. A security method for controlling access to a function of a digital television receiver, comprising the steps of:
- (a) providing a software application at the receiver; said software application being executable in response to an execution command;
- (b) receiving data at the receiver from a headend, said data defining a condition of the receiver under which access to the receiver function by the software application is permitted;
- (c) receiving information at the receiver from the headend, said information defining a security policy for said software application which contains a set of permissions for said software application;
- (d) providing a control signal for requesting access to the receiver function upon execution of said software application;
- (e) in response to said control signal, determining whether the security policy for the software application contains a permission for the software application to access the receiver function;
- (f) if said security policy contains said permission:
  - (i) determining whether said condition of the receiver is met by data indicative of a current state of the receiver;
  - (ii) allowing the software application to access the receiver function if the condition is met; and
  - (iii) preventing the software application from accessing the receiver function if the condition is not met; and
- (g) if said security policy does not contain said permission, preventing the software application from accessing the receiver function;

wherein said condition of the receiver indicates a conditional access state of the receiver; and said conditional access state comprises at least one of: a blackout state and a pay-per-view state.

* * * * *